US006993542B1

(12) United States Patent
Meiyappan

(10) Patent No.: US 6,993,542 B1
(45) Date of Patent: Jan. 31, 2006

(54) EFFICIENT RANDOM NUMBER GENERATION FOR COMMUNICATION SYSTEMS

(75) Inventor: Subramanian Meiyappan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 593 days.

(21) Appl. No.: 09/805,333

(22) Filed: Mar. 12, 2001

(51) Int. Cl.
G06F 1/02 (2006.01)

(52) U.S. Cl. ..................... 708/250; 708/252

(58) Field of Classification Search ........ 708/250–256
See application file for complete search history.

(56) References Cited

U.S. PATENT DOCUMENTS

| | | | | |
|---|---|---|---|---|
| 4,183,088 | A | * | 1/1980 | Simmons ............... 708/250 |
| 4,545,024 | A | * | 10/1985 | Maher et al. ............ 708/255 |
| 5,007,087 | A | * | 4/1991 | Bernstein et al. ......... 708/250 |
| 5,121,349 | A | * | 6/1992 | Naito ................... 708/252 |
| 5,365,585 | A | * | 11/1994 | Puhl et al. .............. 708/250 |
| 5,627,775 | A | | 5/1997 | Hong et al. |
| 5,696,828 | A | * | 12/1997 | Koopman, Jr. ............ 380/46 |
| 5,757,923 | A | * | 5/1998 | Koopman, Jr. ........... 708/250 |
| 5,778,069 | A | * | 7/1998 | Thomlinson et al. ....... 708/250 |
| 5,862,452 | A | * | 1/1999 | Cudak et al. ............. 725/81 |
| 5,961,577 | A | | 10/1999 | Soenen et al. |
| 6,061,702 | A | | 5/2000 | Hoffman |
| 6,188,294 | B1 | * | 2/2001 | Ryan et al. .............. 708/250 |
| 6,215,874 | B1 | | 4/2001 | Borza et al. |
| 6,253,223 | B1 | | 6/2001 | Sprunk |
| 6,263,082 | B1 | | 7/2001 | Ishimoto et al. |
| 6,263,146 | B1 | | 7/2001 | Umeno et al. |
| 6,285,761 | B1 | | 9/2001 | Patel et al. |
| 6,298,360 | B1 | * | 10/2001 | Muller .................. 708/250 |
| 6,374,278 | B1 | * | 4/2002 | Korn et al. .............. 708/250 |
| 6,430,170 | B1 | * | 8/2002 | Saints et al. ............. 708/250 |
| 6,480,072 | B1 | * | 11/2002 | Walsh et al. ............. 708/250 |
| 6,581,078 | B1 | * | 6/2003 | Liardet ................. 708/250 |
| 6,661,833 | B1 | * | 12/2003 | Black et al. ............. 708/250 |
| 2003/0028567 | A1 | * | 2/2003 | Carlson | |
| 2003/0131031 | A1 | * | 7/2003 | Klass | |

* cited by examiner

*Primary Examiner*—Kakali Chaki
*Assistant Examiner*—Chat C Do
(74) *Attorney, Agent, or Firm*—Cindy Kaplan

(57) ABSTRACT

Truly random numbers are generated with a minimum of extra hardware by taking advantage of the inherent noise in a communication channel. Random numbers can thus be generated without specialized manufacturing requirements and can be incorporated to conventional integrated circuits with minimal additional logic. The random number generation technique offloads the processor from performing extensive generation calculations without the use of the hardware accelerator. This random number generation technique may find application in, e.g., any network device that participates in a virtual private network or is used to implement electronic commerce.

19 Claims, 2 Drawing Sheets

EFFICIENT RANDOM NUMBER GENERATION FOR COMMUNICATION SYSTEMS

BACKGROUND OF THE INVENTION

The present invention relates to the generation of random numbers and more particularly to the generation of random numbers in a communication system.

With the ongoing development of the Internet for both commercial transactions and communication of private information, it has become increasingly necessary to encrypt certain Internet information and also to authenticate users and transactions. Protocols employed for authentication and protection of private information typically rely on cryptographic techniques. For example, the IPSEC protocol is used to protect information transported across virtual private networks that facilitate secure private networking over the public Internet. The cryptographic techniques underlying such secure protocols require generation of random numbers to generate encryption and decryption keys that assure secure operation. The security achieved depends on generation of truly random numbers whose values cannot be predicted by those seeking to compromise security.

Generating truly random numbers is a non-trivial task. To generate a single truly random number in software may require millions of clock cycles. To accomplish this without severely impacting other processing, a separate hardware accelerator is often used to offload the main processor, adding expense and complexity. Another solution is to substitute a significantly more powerful main processor, also adding expense.

There are other techniques that rely only on hardware to generate truly random numbers. Typically, the hardware computation of a random number begins by generating a seed that is obtained by monitoring a randomly varying parameter of a solid state device or other electronic component. For example, one may monitor the seek times of disk drives, thermal noise of a resistor, clock jitter in a phase locked loop, an XOR'ed combination of oscillator outputs, radioactive decay times, etc. These techniques require relatively expensive customized hardware. For example, monitoring thermal noise of a resistor requires both a specialized resistor and a zener diode.

What is needed are systems and methods for random number generation that require a minimum of specialized hardware and additional cost, and that can be readily applied to secure communications.

SUMMARY OF THE INVENTION

According to one embodiment of the present invention, truly random numbers are generated with a minimum of extra hardware by taking advantage of the noise inherent in a communication channel. Random numbers can thus be generated without specialized manufacturing requirements and can be incorporated into conventional integrated circuits with minimal additional logic. The random number generation technique offloads the processor from performing extensive random number generation calculations without the use of a hardware accelerator. This random number generation technique may find application in any network device that participates in a virtual private network or is used to implement secure electronic commerce.

According to one aspect of the present invention, a method for generating a random value includes: monitoring a signal obtained from a communication channel where the signal includes additive noise, sampling the signal to generate a random value, and storing the random value.

A further understanding of the nature and advantages of the inventions herein may be realized by reference to the remaining portions of the specification and the attached drawings.

DESCRIPTION OF SPECIFIC EMBODIMENTS

The present invention will be described in the context of a communication system where information is transmitted over a communication channel by modulating the signal. At the receiver of the communication channel, the modulation signal is received but Additive White Gaussian Noise (AWGN) is also received superimposed on the modulated signal. The AWGN is for most purposes an impairment to the performance of the communication system making it more difficult for the receiver to determine exactly what data has been transmitted. However, according to the present invention, this additive noise is exploited to advantage. The noise is used as the basis for generating a random number that can then support cryptographic activities such as the generation of secure keys. This supports higher-level protocols for authentication and encryption. Examples of communication systems where this additive noise may be exploited include a wireless communication network, a data over cable network, a DSL network, etc. Such networks are often used to implement user access to the Internet at the physical layer. For these networks, the transmission medium, whether it be the airwaves, coaxial cable, twisted pair, etc., adds noise to the propagated signal incident at the receiver.

Figure 1:
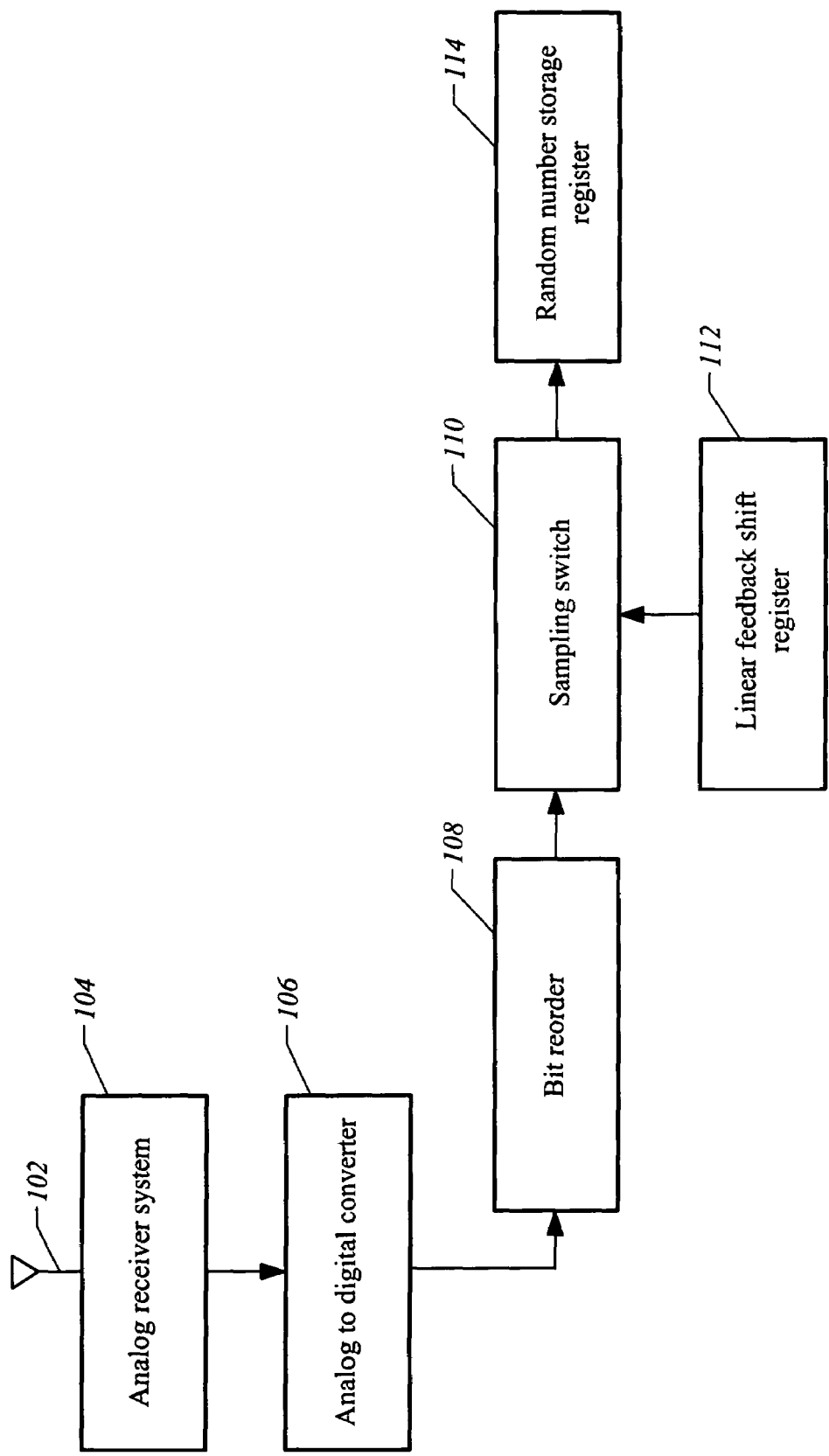
FIG. 1 is a block diagram of random number generation system according to one embodiment of the present invention.

FIG. 1 depicts a random number generation system according to one embodiment of the present invention. FIG. 1 depicts a random number generation system in the context of a communication system that exploits a wireless communication channel. A random number generation system of the present invention can, however, exploit the additive noise provided by any type of communication channel.

An antenna 102 picks up a modulated signal from the airwaves. The modulated signal is at a frequency referred to as the radio frequency (RF). An analog receiver system 104 receives, amplifies, and filters the RF modulated signal. Analog receiver system 104 also converts the RF signal to an intermediate frequency (IF) to form an IF modulated signal. The IF signal is converted to baseband and sampled and digitized by an analog to digital converter 106. Antenna 102, analog receiver system 104 and analog to digital converter 106 are all components that would be included even without the implementation of the random number generation techniques of the present invention.

Figure 2:
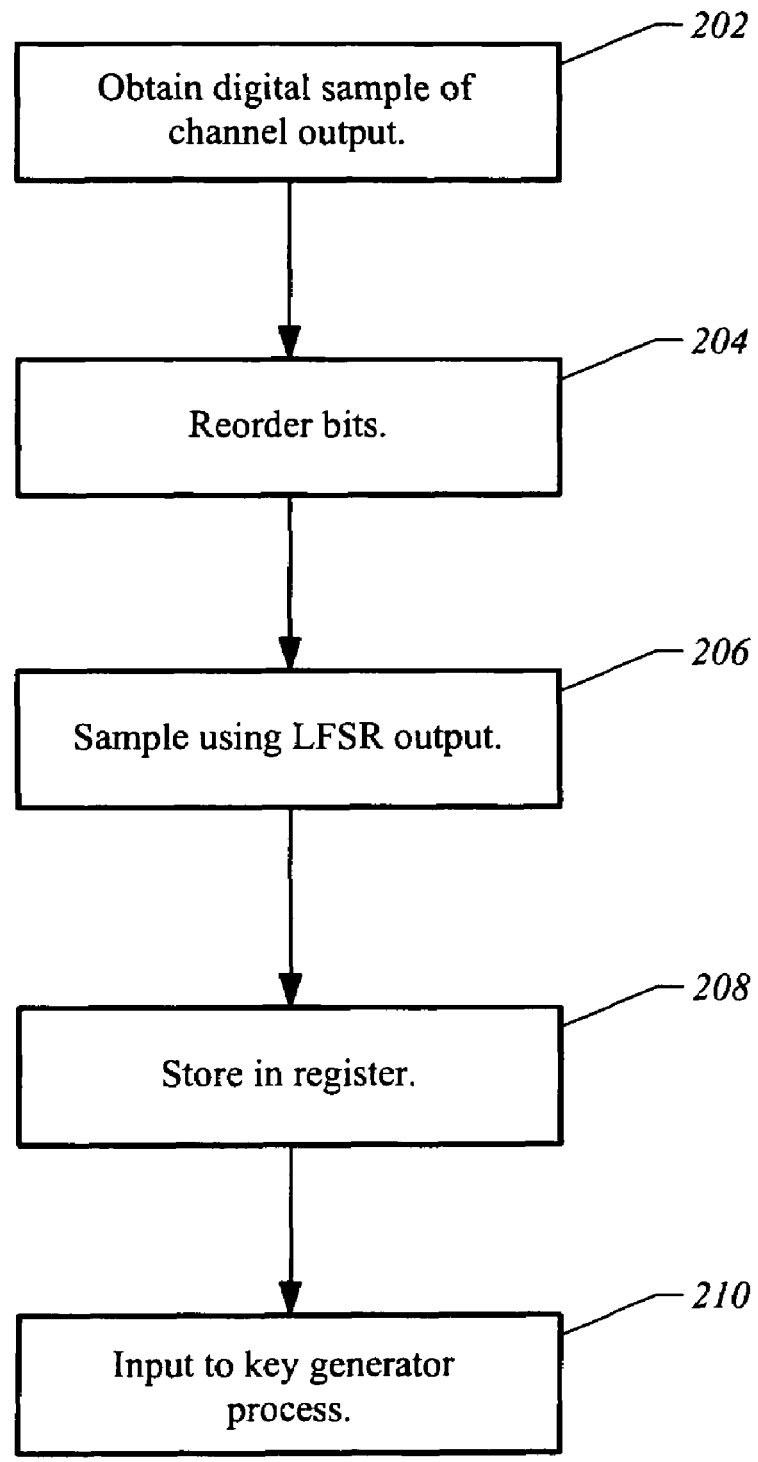
FIG. 2 is a flow chart describing operation of the random generation system of FIG. 1.

The output of analog to digital converter 106 is a digital representation of the transmitted modulated signal plus the noise added by the wireless communication channel. The remaining discussion of random number generation will also refer to a flow chart, FIG. 2.

At step 202, analog to digital converter 106 obtains an N-bit digital sample. The samples are obtained at intervals determined by the design of the communication system. At step 204, a bit reordering block 108 psuedo-randomly scrambles the parallel outputs of analog to digital converter 106. This scrambling is performed separately for each N-bit sample output by converter 106. In one embodiment, this reordering is based on a random N-bit number generated by a linear feedback shift register (LFSR) as known in the art (see citation below). For example, each bit of the N-bit number may be fed to each of N multiplexers. The select signal for the multiplexers is derived from the LFSR output bits such that each multiplexer outputs a different bit of the N-bit sample output. This LFSR (not shown) can itself be initialized using a sample from analog to digital converter 106.

Not every N bit sample is used in generating random numbers. At step 206, a sampling switch 110 samples the output of bit reordering block 108. Sampling switch 110 samples during periods when its sampling input line is active and does not sample when its sampling input is inactive. Sampling switch 110 may be implemented by a simple FET. The sampling input to sampling switch 110 is provided by the output of a linear feedback shift register 112. The internal structure of linear feedback shift register 112 is known in the art. Further details of linear feedback shift register operation are described in Schneier, *Applied Cryptography*, ($2^{nd}$ Ed. 1996), pp. 372–378, the contents of this entire volume being incorporated herein by reference for all purposes.

The effect of reordering block 108 and sampling switch 110 is to remove the non-random structure of the transmitted signal and therefore isolate the noise component. The output of sampling switch 110 is also N bits wide and is periodically clocked into a random number storage register 114 at a step 208.

Random numbers will be clocked into register 114 repeatedly and may be recalled for use as needed. Thus, at step 210, the random number in random number storage register 114 may be recalled for use in, e.g., generating a cryptographic key. One example of an application that would make use of this random number is the well-known IPSEC protocol described in Kent, et al., Request for Comments 2401 published in November 1998 by the Internet Engineering Task Force, the contents are which herein incorporated by reference in their entirety for all purposes.

In an alternative embodiment, optimized for use in applications where power consumption is critical such as portable applications, the beginning of a secure session necessitating random number generation activates switch 110 and permits clocking by linear feedback shift register 112. Otherwise, these components (and also bit reordering block 108) are kept off to save power. Once the session begins, the secure application can read random numbers from random number storage register 114 as needed. The systems and techniques described above achieve random number generation while adding minimal hardware to a communication system. Antenna 102, analog receiver system 104, and analog to digital converter 106 are typically already included in any digital communication system and need not be modified to support random number generation. Assume a 12 bit wide output for converter 106 and a 12 bit number stored in random number storage register 114. Bit reordering block 108 may be implemented in as few as 100 gates. Sampling switch 110 can be a single FET, linear feedback shift register 112 can be implemented in as few as 50 gates, and random number storage register 114 may require as few as 100 gates. Thus, the entire random number capability is added using only approximately 250 gates.

These gates can readily be added to a VLSI integrated circuit that is typically included in the digital communication system for the purpose of implementing signal processing algorithms. The low cost and simple implementation thus achieved offers a significant advantage over random number generation systems that rely on an additional processor, use of a more powerful digital processor than would be otherwise necessary for digital communications, or specialized parts such as zener diodes, etc.

It is understood that the examples and embodiments described herein are for illustrative purposes only and that various modifications or changes in light thereof will be suggested to persons skilled in the art and are to be included in the spirit and purview of this application and the scope of the appended claims and their full scope of equivalents. Bit reordering block 108, sampling switch 110, and linear feedback shift register 112 represent only one example of a monitoring circuit that monitors the signal received via the communications channel and generates a random number based on this signal.

What is claimed is:

1. A method for generating a random value, said method comprising:
   monitoring a signal obtained from a communication channel, said communication channel being part of a communication network, said signal being arranged to include data, said signal further including additive noise, wherein said communication network is arranged to implement access to the Internet;
   sampling said signal to generate a random value, wherein sampling comprises sampling at times determined by output of a linear feedback shift register; and
   storing said random value.

2. The method of claim 1 further comprising:
   using said random value as input to a cryptographic key generation process.

3. The method of claim 1 wherein monitoring comprises monitoring a digital signal represented by multiple bits.

4. The method of claim 3 further comprising:
   reordering said multiple bits prior to sampling.

5. The method of claim 3 wherein said digital signal comprises output of a analog to digital converter.

6. The method of claim 1 wherein the signal further includes a modulation signal, and the additive noise is Additive White Gaussian Noise.

7. The method of claim 1 wherein said communication network is one of a wireless communication network, a data over cable network, and a DSL network.

8. The method of claim 1 wherein storing said random value includes clocking said random value into a register.

9. The method of claim 1 wherein sampling at times determined by output of a linear feedback register comprises determining when said output of said linear register feedback shift register is an input to a sampling switch, wherein sampling said signal to generate a random value occurs when said output of said linear register feedback shift register is said input to said sampling switch.

10. Apparatus for generating a random value, said apparatus comprising:
    means for monitoring a signal obtained from a communication channel of a communication network, said signal being arranged to include data, said signal further including additive noise, wherein the communication network is arranged to implement access to the Internet;
    means for sampling said signal to generate a random value, wherein said sampling means comprises means for sampling at times determined by output of a linear feedback shift register; and means for storing said random value.

11. The apparatus of claim 10 further comprising:
means for using said random value as input to a cryptographic key generation process.

12. The apparatus of claim 10 wherein said means for monitoring comprises means for monitoring a digital signal represented by multiple bits.

13. The apparatus of claim 12 further comprising:
means for reordering said multiple bits prior to sampling.

14. The apparatus of claim 12 wherein said digital signal comprises output of a to analog to digital converter.

15. Apparatus for generating a random value, said apparatus comprising:
a monitoring circuit that monitors a signal derived from a communication channel output of a communication network, the signal being arranged to include data, wherein the communication network is arranged to implement access to the Internet;
a register that stores a random value generated from said signal; and
a linear feedback shift register that controls sampling times of said samples.

16. The apparatus of claim 15 further comprising:
a sampler that samples said signal to generate said random value.

17. The apparatus of claim 16 wherein said signal comprises a digital signal.

18. The apparatus of claim 17 wherein said digital signal is obtained from output of an analog to digital converter.

19. The apparatus of claim 15 wherein said digital signal is represented by multiple bits and further comprising:
a bit reordering stage that reorders said multiple bits to generate said random value.

* * * * *